United States Patent
Ebata et al.

(10) Patent No.: US 8,174,998 B2
(45) Date of Patent: May 8, 2012

(54) NETWORK CONNECTING APPARATUS AND CONNECTION SETUP METHOD

(75) Inventors: Koichi Ebata, Tokyo (JP); Kazuhiro Okanoue, Tokyo (JP); Akira Miyashita, Tokyo (JP)

(73) Assignee: NEC Corporation, Tokyo (JP)

( * ) Notice: Subject to any disclaimer, the term of this patent is extended or adjusted under 35 U.S.C. 154(b) by 330 days.

(21) Appl. No.: 12/426,543

(22) Filed: Apr. 20, 2009

(65) Prior Publication Data

US 2010/0265894 A1  Oct. 21, 2010

(30) Foreign Application Priority Data

Apr. 18, 2008 (JP) .................................. 2008-108919

(51) Int. Cl.
*H04L 12/26* (2006.01)
(52) U.S. Cl. .......................... 370/252; 370/329; 370/338
(58) Field of Classification Search .......... 370/229–234, 370/252, 253, 328–338, 395.2, 395.21, 400, 370/401
See application file for complete search history.

(56) References Cited

U.S. PATENT DOCUMENTS

| 7,477,632 B1* | 1/2009 | Radhakrishnan et al. ..... 370/338 |
| 2005/0063400 A1* | 3/2005 | Lum .............................. 370/401 |
| 2005/0260989 A1* | 11/2005 | Pourtier et al. ............. 455/435.3 |
| 2006/0117174 A1* | 6/2006 | Lee ................................ 713/154 |

FOREIGN PATENT DOCUMENTS

| JP | 2000244601 A | 9/2000 |
| JP | 2005286585 A | 10/2005 |

\* cited by examiner

*Primary Examiner* — Pao Sinkantarakorn (57) ABSTRACT

In a network connecting apparatus, relations of targets and attributions of the targets are registered in a attribution table and relations of the attributions and available connection settings are registered in a connection setting table. An attribution determining section is configured to specify a target when detecting a request of a wireless communication associated with the target, and refer to the attribution table to determine the attribution of the target. A connection setting section is configured to change a connection setting based on the target attribution by referring to the connection setting table. A connecting section is configured to execute a connecting process for the wireless communication based on the connection setting.

18 Claims, 6 Drawing Sheets

| APPLIATION | APPLICATION ATTRIBUTION |
|---|---|
| APP_1 | WEB CONFERENCE |
| APP_2 | SOFTPHONE |
| APP_3 | GROUPWARE |

| APPLICATION ATTRIBUTION | CONNECTION SETTING |
|---|---|
| WEB CONFERENCE | SSID_1 |
| SOFTPHONE | SSID_2 |
| GROUPWARE | SSID_3 |

| TERMINAL | TERMINAL ATTRIBUTION |
|---|---|
| TERMINAL_1 | PC |
| TERMINAL_2 | GAME MACHINE |
| TERMINAL_3 | OTHER EQUIPMENT |

| TERMINAL ATTRIBUTION | CONNECTION SETTING |
|---|---|
| OTHER EQUIPMENT | SSID_1 |
| PC | SSID_2 |
| GAME MACHINE | SSID_3 |

| APPLICATION ATTRIBUTION | CONNECTION SETTING | I/F |
|---|---|---|
| WEB CONFERENCE | SSID_1 | eth_0 |
| SOFTPHONE | SSID_2 | eth_1 |
| GROUPWARE | SSID_3 | eth_1 |

35

NETWORK CONNECTING APPARATUS AND CONNECTION SETUP METHOD

INCORPORATION BY REFERENCE

This patent application claims priority on convention based on Japanese Patent Application No. 2008-108919, filed Apr. 18, 2009. The disclosure thereof is incorporated herein by reference.

TECHNICAL FIELD

The present invention relates to a network connecting apparatus, and more particularly to a network connecting apparatus to be used for wireless communication.

BACKGROUND ART

A wireless communication network can be typically exemplified by a wireless Local Area Network (hereinafter, to be referred to as a LAN). The wireless LAN utilizes radio wave for communication, and accordingly, there is a possibility that a plurality of access points may become available to make communication, unlike in a wired LAN. Accordingly, a wireless identifier called a Service Set Identifier (SSID) is usually allocated to the access point of the wireless LAN and to each terminal, so that the communication can only be made between the access point and the terminal having the same SSID. Meanwhile, currently the SSID often specifies an Extended Service Set Identifier (ESSID).

A Wireless Zero Configuration (WZC) is known as one application software program for wireless LAN connection currently employed in a terminal such as a personal computer (PC). The WZC designates a priority of the SSID in setting the wireless LAN connection. The WZC also receives radio wave of the wireless LAN and determines the SSID to which the connection is possible, thereby performing the connection according to the priority. According to the WZC, however, a priority order is fixed irrespective of situations such as an application attribution of the user and user attribution, and therefore an operation cannot be performed in compliance with the design policy.

As a related art 1, an apparatus for selecting a data line is disclosed in Japanese Patent Application Publication (JP-P2000-244601A). According to this related art 1, a priority order is given to the data lines to be connected with respect to each application. However, this technique does not make distinction among the same type of data lines, and is therefore not applicable in case of utilizing the same type of data lines under different settings according to the design policy.

Also, Japanese Patent Application Publication (JP-P2005-286585A) as a related art 2 discloses a wireless LAN automatic selection connecting system. According to the related art 2, when a terminal is to be connected to a wireless LAN, the terminal selects the wireless LAN based on a data on the service contents offered by a server to be connected with, and performs the connection. Here, it is necessary to identify the data on the service contents offered by the server to be connected with, when the terminal selects a wireless LAN to be connected.

SUMMARY

In a wireless communication network including the wireless LAN, a communication line is prone to suffer congestion when a plurality of users utilizes a same band for communication. However, in the wireless LAN, for example, normally each of the terminals permitted to make access to the access point in the same wireless LAN is given the same SSID, so that the wireless communication is performed under the same connection setting.

In the wireless communication network including the wireless LAN a method that the connection setting is performed according to a state of each terminal is being sought for.

The present invention can change the connection setting according to individual properties, taking into consideration the properties accompanying various factors associated with wireless communication.

BRIEF DESCRIPTION OF THE DRAWINGS

The above and other objects, advantages and features of the present invention will be more apparent from the following description of certain exemplary embodiments taken in conjunction with the accompanying drawings, in which.

EXEMPLARY EMBODIMENTS

Hereinafter, a network connecting apparatus of the present invention will be described with reference to the attached drawings.

First Exemplary Embodiment

Figure 1:
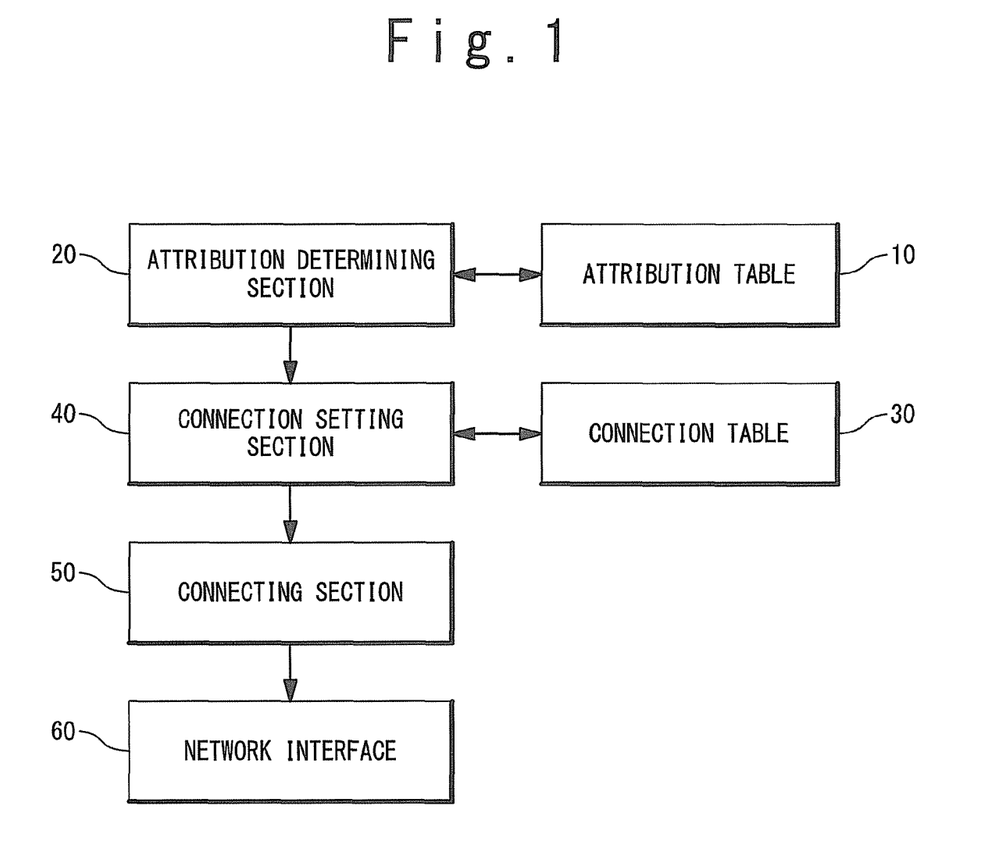
FIG. 1 is a block diagram showing a configuration of a network connecting apparatus according to the present invention.

Referring first to FIG. 1, the network connecting apparatus according to a first exemplary embodiment of the present invention includes an attribution table 10, an attribution determining section 20, a connection table 30, a connection setting section 40, a connecting section 50, and a network interface 60.

Figure 2:
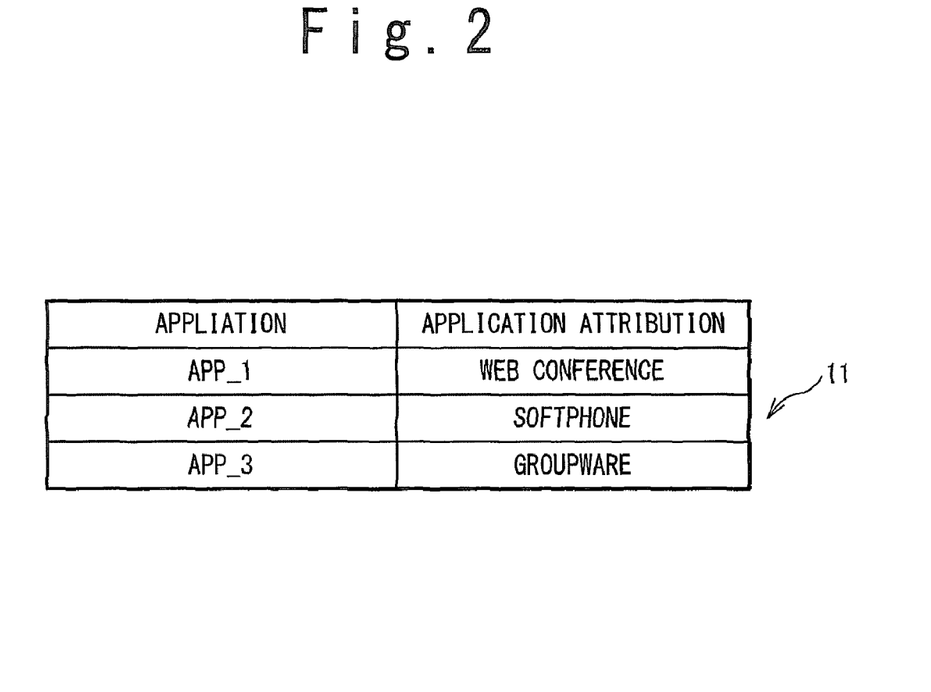
FIG. 2 is an example of an application/attribution table.

The attribution table 10 stores a relation between "a predetermined target" and "an attribution accompanying the target". Thus, the attribution accompanying the target may be changed as desired. In the present exemplary embodiment, an application attribution table 11 is used as an example of the attribution table 10. Referring to FIG. 2, a format example of the application attribution table 11 will be described. The application attribution table 11 contains "application" and "application attribution". The application and the application attribution are associated with each other. The application includes an identification data of the application which carries out communication through the wireless LAN (Local Area Network). As examples of the identification data of the application, an individual number, a data format, and an identifier of the application could be considered. The application attribution is an attribution accompanying the application. In this example, when the application is specified as APP_1, APP_2, and APP_3, an application attribution of APP_1 is a web conference, an application attribution of APP_2 is a softphone, and an application attribution of APP_3 is groupware. A default application attribution may be allocated to the application having no application attribution. For example, an application having no application attribution may be unconditionally regarded as an application having the application attribution of the groupware.

The attribution determining section 20 identifies the target upon detection of a request for communication with the target through a wireless LAN, and refers to the attribution table 10 to determine the attribution of the target. In the present exemplary embodiment, when detecting start of the application that utilizes the wireless LAN or start of communication, the attribution determining section 20 refers to the application attribution table 11 to determine the attribution of the application.

The connection table 30 stores a relation of an "attribution of a predetermined target" and an "available connection setting". The relation between the attribution of the predetermined target and the available connection setting is registered in the attribution table 10. That is, the connection setting associated with the attribution of the target may be changed as desired. In the present exemplary embodiment, the connection table 30 is exemplified by an application attribution/connection table 31.

Figure 3:
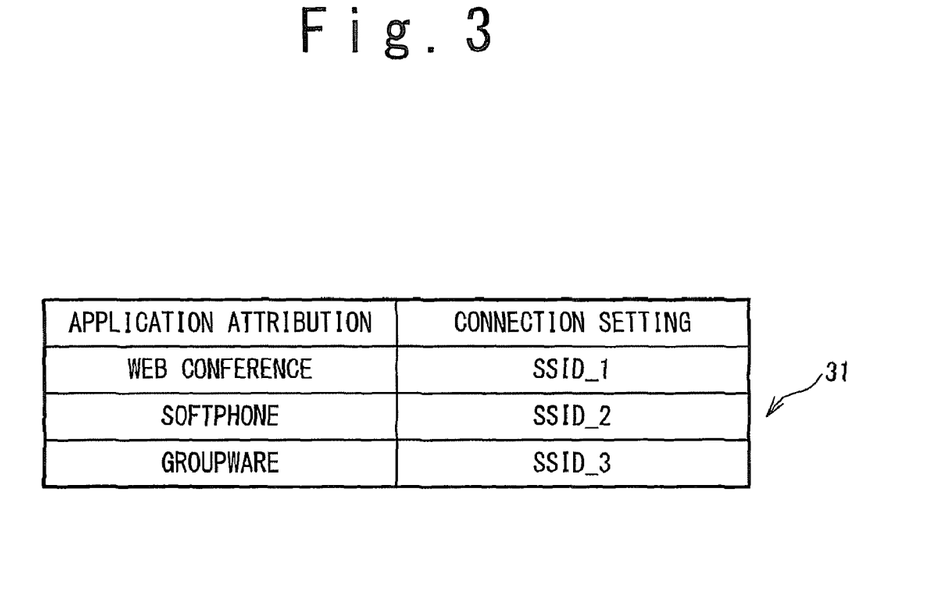
FIG. 3 is an example of an application attribution connection setting table.

Referring to FIG. 3, a format example of the application attribution/connection table 31 will be described. The application attribution/connection table 31 contains the application attribution and the connection setting. The application attribution and the connection setting are associated with each other. The application attribution indicates the attribution of the application, and corresponds to the application attribution in the application attribution table 11. The connection setting specifies the setting of the connection for the application having the above attribution. For example, the connection setting indicates the setting of the connection when the application having the attribution performs a communication by using the network interface 60. In the present exemplary embodiment, the application attribution is exemplified by a WEB conference, a softphone, and groupware. The connection setting for the WEB conference is SSID_1. The connection setting for the softphone is SSID_2. The connection setting for the groupware is SSID_3. Each of the SSID_1, the SSID_2, and the SSID_3 indicates the SSID or the ESSID.

It should be noted that the connection setting may be carried out to the application having no application attribution. In this case, the application having no application attribution is not allocated with any SSID. Thus, only the application permitted in advance can be set to be possible to carry out a communication. Alternatively, the application having no application attribution may be allocated with a default connection setting. For example, the connection setting of the SSID_3 may be allocated to the application having no application attribution.

The connection setting section 40 receives a notice of the attribution of a predetermined target from the attribution determining section 20, and refers to the connection table 30 to set a connection according to the attribution of the target. In the present exemplary embodiment, the connection setting section 40 selects and determines an appropriate connection setting from the connection table 30 according to the application attribution.

The connecting section 50 performs a connection based on the connection setting determined by the connection setting section 40. In the present exemplary embodiment, the connecting section 50 executes a process for making communication through the network interface 60 based on a connection setting.

The network interface 60 is a communication interface (hereinafter, interface) configured for wireless communication. In the present exemplary embodiment, the network interface 60 makes communication through the wireless LAN.

An example of a storage section that stores therein the attribution table 10 and the connection table 30, a semiconductor storage device such as a memory, an external storage apparatus such as a hard disk, or a storage medium. However, the storage device is not limited to these examples.

Examples of the attribution determining section 20, the connection setting section 40, and the connecting section 50 include a processing device such as a CPU (Central Processing Unit) or a microprocessor, or by a semiconductor Integrated Circuit (IC) having the equivalent function. Alternatively, the attribution determining section 20, the connection setting section 40, and the connecting section 50 may be realized by a program which is loaded from a recording medium (not shown) into the network connecting apparatus and executed by a computer to attain the respective functions. In this case, the realization of these sections is not limited to the above examples.

The network interface 60 may be exemplified by a Network Interface Card (NIC) such as a wireless LAN card, or a media converter such as a wireless LAN converter. However, the present invention is not limited to the above examples.

Figure 4:
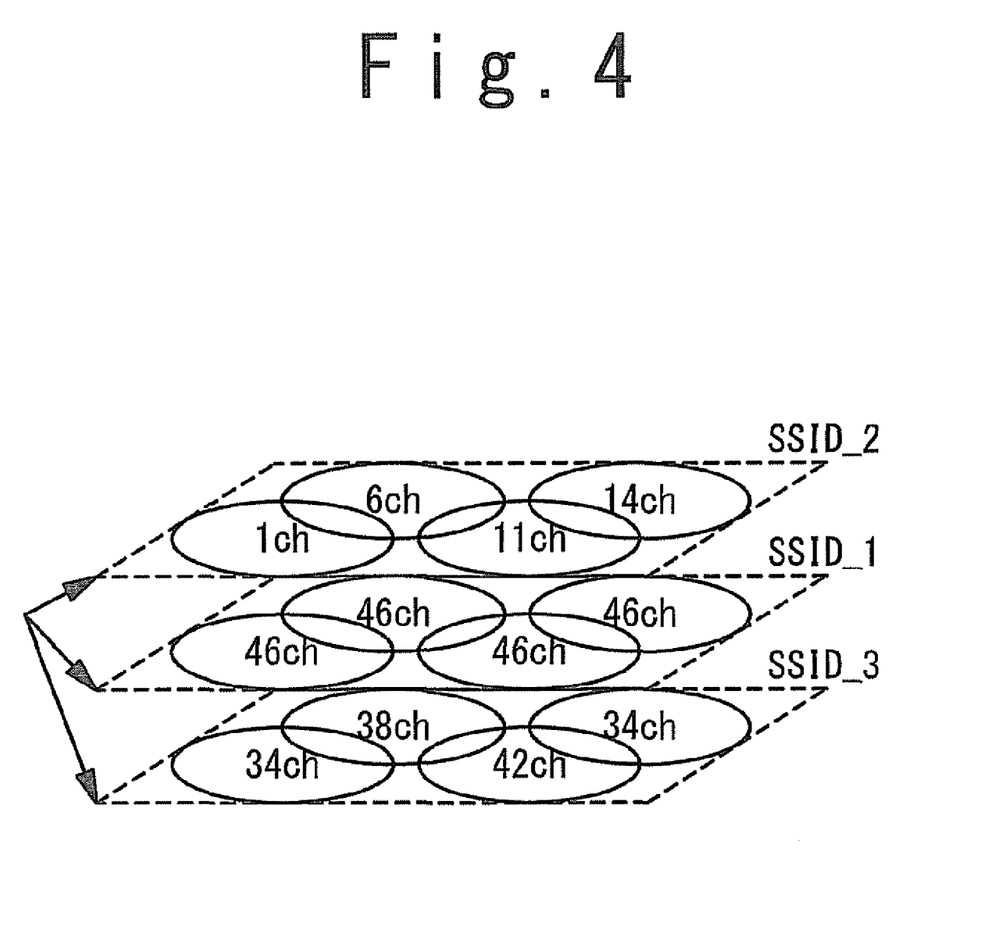
FIG. 4 is a diagram showing a design of a wireless LAN.

Referring to FIG. 4, a design example of the wireless LAN will be described. In the present exemplary embodiment, the service is provided at a same place, by using different SSIDs, and through different wireless channel media (hereinafter, channel). In this example, the SSIDs are specified as SSID_1, SSID_2, and SSID_3. The SSID_1 specifies "46ch" as a channel to be utilized. The SSID_2 specifies "1ch", "6ch", "11ch", and "14ch" as channels to be utilized. The SSID_3 specifies "34ch", "38ch", and "42ch" as channels to be utilized. For example, when the connection setting is determined as SSID_1, a plurality of users share a single channel. When the connection setting is determined as SSID_2, four channels are available, and therefore different channels can be utilized depending on a used access point.

Figure 5:
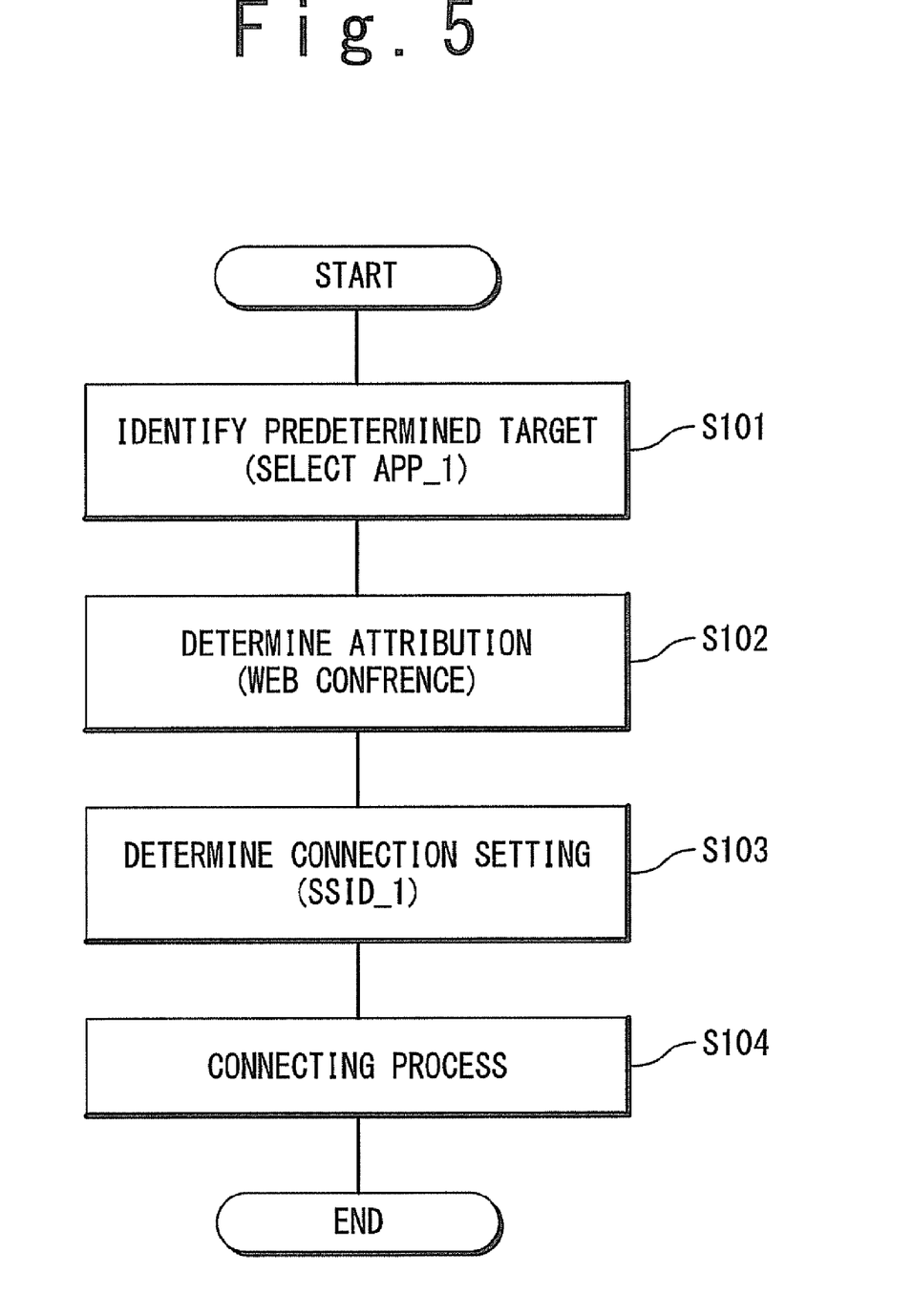
FIG. 5 is a flowchart showing an operation according to the present invention.

Referring now to FIG. 5, a process flow according to the present invention will be described.

(1) Step S101

The network connecting apparatus identifies a predetermined target. In the present exemplary embodiment, the network connecting apparatus determines an application started in response to an operation by a user, as an application to be executed. In this example, the network connecting apparatus selects and determines the application APP_1.

(2) Step S102

The attribution determining section 20 refers to the attribution table 10 to determine the attribution of the determined target. In the present exemplary embodiment, the attribution determining section 20 refers to the application attribution table 11 and determines the application attribution corresponding to the application to be executed. In this example, the attribution determining section 20 determines that the application attribution of the application APP_1 is a WEB conference.

(3) Step S103

The connection setting section 40 refers to the connection table 30 to perform the connection setting according to the attribution of the target. In the present exemplary embodiment, the connection setting section 40 refers to the application attribution/connection table 31, and selects and sets SSID corresponding to the application attribution that has been determined. In this example, the connection setting section 40 selects and sets SSID_1, which corresponds to the WEB conference.

(4) Step S104

The connecting section 50 executes a connecting process based on the connection setting determined by the connection setting section 40. In the present exemplary embodiment, the connecting section 50 performs the connection by using the network interface 60 based on the selected SSID. In this example, the connecting section 50 performs the wireless LAN communication with an access point connectable under the connection setting SSID_1, through the network interface 60.

The connecting section 50 may request another connection setting when the connection cannot be established based on the connection setting determined by the connection setting section 40. In this case, a plurality of connection settings are to be associated with a single application attribution in the application attribution/connection table 31, and a priority order is allocated to each of the plurality of connection settings in advance. For example, "SSID_1, SSID_2, SSID_3" may be associated with the "WEB conference" in the application attribution/connection table 31. Here, it is assumed that "SSID_1, SSID_2, SSID_3" have higher priorities in descending order. The connecting section 50 requests another connection setting to the connection setting section 40 when the connection under the connection setting SSID_1 has failed upon start of the application, the attribution of which is the WEB conference, because of line congestion. The connection setting section 40 thus selects and sets SSID_2 for the WEB conference.

Further, a priority order for the connection settings may be determined in advance, in case of executing a plurality of applications at a time. In this case, the priority order may be allocated to the application attributions. For example, the WEB conference may be allocated with a higher priority than the softphone, so that the connection setting section 40 switches from the connection setting SSID_2 to the connection setting SSID_1 when an application having the attribution of the WEB conference is started during the execution of another application having attribution of the softphone. This means that, under the assumption of the connection setting SSID_2 corresponding to the application attribution of the softphone and the connection setting SSID_1 corresponding to the application attribution of the WEB conference, the connection setting is switched from the connection setting SSID_2 to the connection setting SSID_1, if the WEB conference is started in a state that only the softphone is being executed, because WEB conference has a higher priority than the softphone.

In addition, the connection setting section 40 may continue the use of a connection setting of an application started earlier. This is because changing the connection setting incurs a temporary disconnection of the line, though for a short period of time, which may provoke degradation in communication quality. For example, when the application having the attribution of the softphone is started during the execution of the application having the attribution of the groupware, the connection setting section 40 may continue to use the connection setting SSID_3 for the groupware.

It should be noted that the present invention is also applicable to a case where the attribution table 10 and the connection table 30 are acquired from a server or a wireless LAN access point. In this case, the connecting section 50 may be configured to use a default connection setting that does not depend on the attribution, and to perform the connection setting with a server or a wireless LAN access point in which the attribution table 10 and the connection table 30 are stored. For example, the connecting section 50 may unconditionally use the connection setting SSID_3 upon start of the application, and make access to the server or the wireless LAN access point in which the attribution table 10 and the connection table 30 are stored, in order for the attribution determining section 20 and the connection setting section 40 to refer to the attribution table 10 and the connection table 30.

Controlling the attribution table 10 and the connection table 30 on the server side, the server can control the wireless LAN connection of each individual network connecting apparatus through the attribution table 10 and the connection table 30. As a result, even though a design policy of the SSID is changed during the operation, the terminal setting can be dynamically changed by the server, to continue the operation in accordance with the design policy. Also, controlling the attribution table 10 and the connection table 30 on the wireless LAN access point, it is possible to reduce a possibility that an unauthorized party acquires the attribution table 10 and the connection table 30 through the individual network connecting apparatus, because the attribution table 10 and the connection table 30 are provided to the network connecting apparatus only when the wireless LAN access point is utilized.

The present invention is also applicable to a case where the attribution table 10 and the connection table 30 are acquired from an external storage medium. For example, the attribution table 10 and the connection table 30 may be stored in a Universal Serial Bus (USB) memory, a Digital Versatile Disk (DVD), or a NIC for the wireless LAN. In this case, the attribution determining section 20 and the connection setting section 40 may make access to the USB memory, the DVD, or the NIC for the wireless LAN in which the attribution table 10 and the connection table 30 are stored, to refer to the attribution table 10 and the connection table 30.

It is preferable that the connecting section 50 is configured to limit the connection when the attribution determining section 20 is unable to refer to the attribution table 10, or the connection setting section 40 is unable to refer to the connection table 30. For example, the connecting section 50 may be configured to inhibit the connection or to permit the use of a specific SSID only, when the attribution determining section 20 is unable to refer to the attribution table 10, or the connection setting section 40 is unable to refer to the connection table 30.

Next, the network connecting apparatus according to a second exemplary embodiment of the present invention will be described. In the present exemplary embodiment, a user attribution is used in place of the application attribution. For example, an exclusive channel is allocated to a premium user who has paid a special fee, to making distinction from general users.

Figure 6:
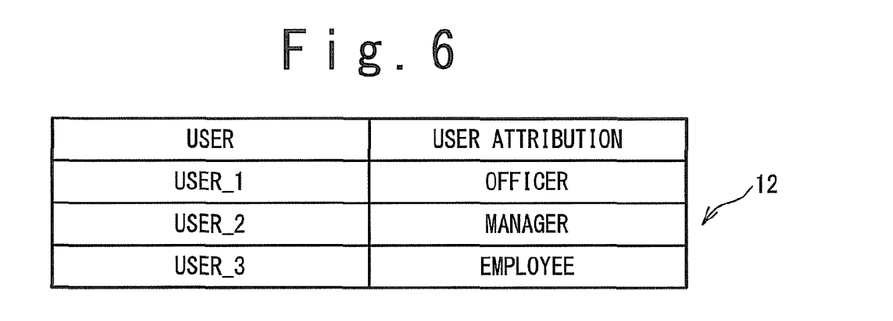
FIG. 6 is an example of a user/attribution table.

In the present exemplary embodiment, the attribution table 10 is exemplified by a user attribution table 12. Referring to FIG. 6, a format example of the user attribution table 12 will be described. The user attribution table 12 contains "user" and "user attribution". The user and the user attribution are associated with each other. The user indicates the identification data of the user who makes communication through the wireless LAN. Examples of the user identification data are such as a log-in ID and an employee number. The user attribution indicates an attribution accompanying the user. In this example, the user is specified as user_1, user_2, or user_3. A user attribution of the user_1 is an officer. A user attribution of the user_2 is a manager. A user attribution of the user_3 is an employee. A user having no user attribution may be allocated with a default user attribution. For example, the user having no user attribution may be unconditionally regarded as a user having the user attribution of the employee.

Figure 7:
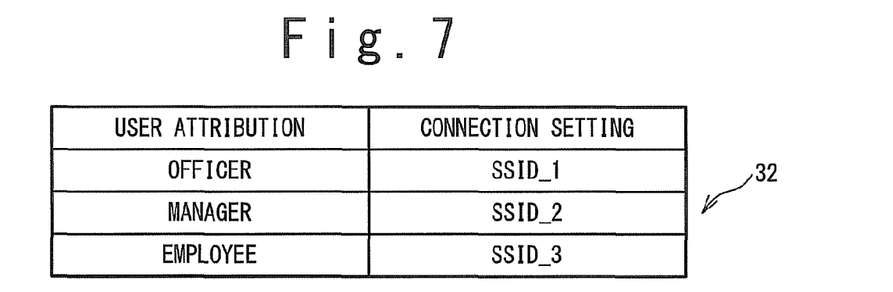
FIG. 7 is an example of a user attribution/connection setting table.

In the present exemplary embodiment, the connection table 30 is exemplified by a user attribution/connection table 32. Referring to FIG. 7, a format example of the user attribution/connection table 32 will be described. The user attribution/connection table 32 contains "user attribution" and "connection setting". The user attribution and the connection setting are associated with each other. The user attribution indicates the attribution of the determined user, and corresponds to the user attribution in the user attribution table 12. The connection setting indicates the connection setting for the user having the attribution. For example, the connection setting indicates the connection setting for the user having the attribution to make communication through the network interface 60. In this example, the user attribution is specified as an employee, an officer, or a manager. A connection setting for the employee is SSID_1. A connection setting for the officer is SSID_2. A connection setting for the manager is SSID_3. Each of the SSID_1, the SSID_2, and the SSID_3 indicates the SSID or the ESSID.

It should be noted that the connection setting may not be performed to a user having no user attribution. In this case, the user having no user attribution is not allocated with any SSID. Thus, only those users permitted in advance can make communication. Moreover, the user having no user attribution may be allocated with a default connection setting. For example, the user having no user attribution may be unconditionally allocated with SSID_3 as the connection setting.

The remaining aspects are the same as those of the first exemplary embodiment.

Next, the network connecting apparatus according to a third exemplary embodiment of the present invention will be described. In the present exemplary embodiment, a connection destination attribution is used in place of the application attribution. For example, different SSIDs are allocated to the wireless LAN communication with a commercial server and the wireless LAN communication with a general WEB server. Here, the attribution determining section 20 can identify the connection destination from an Internet Protocol (IP) address included in a transmission packet or a frame, provided that the connection destination is a server or the like. The attribution determining section 20 can also identify the connection destination from the data format or the application identifier included in the transmission packet or the frame, provided that the connection destination is a specific application or the like.

Figure 8:
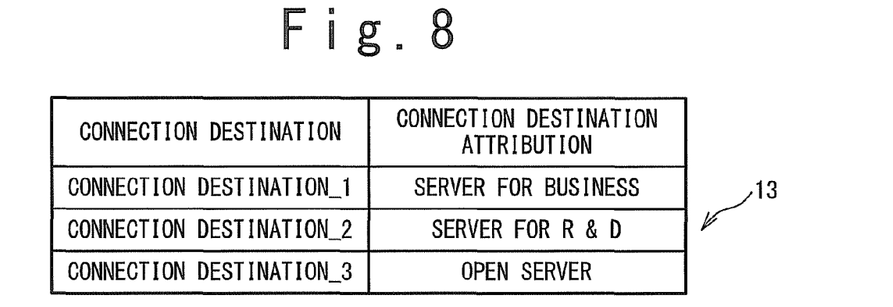
FIG. 8 is an example of a connection destination/attribution table.

In the present exemplary embodiment, the attribution table 10 is exemplified by a connection destination attribution table 13. Referring to FIG. 8, a format example of the connection destination attribution table 13 will be described. The connection destination attribution table 13 contains "connection destination" and "connection destination attribution". The connection destination and the connection destination attribution are associated with each other. The connection destination indicates an identification data of the connection destination to communicate through the wireless LAN. As examples of the identification data of the connection destination, an IP address and a domain name are listed up. The connection destination attribution indicates the attribution accompanying the connection destination. In this example, the connection destination is specified as connection destination _1, connection destination _2, or connection destination _3. The connection destination attribution of the connection destination _1 is a commercial server. The connection destination attribution of the connection destination _2 is an R&D server. The connection destination attribution of the connection destination _3 is a public server. A connection destination having no connection destination attribution may be allocated with a default connection destination attribution. For example, the connection destination having no connection destination attribution may be unconditionally regarded as a connection destination having connection destination attribution of the public server.

Figure 9:
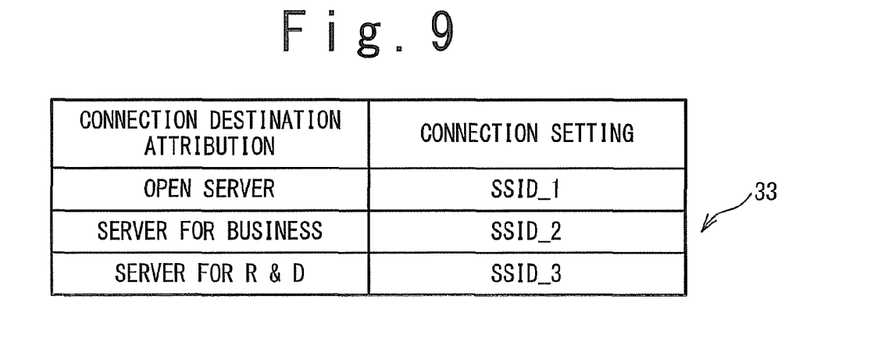
FIG. 9 is an example of a connection destination attribution/connection setting table.

In the present exemplary embodiment, the connection table 30 is exemplified by a connection destination attribution/connection table 33. Referring to FIG. 9, a format example of the connection destination attribution/connection table 33 will be described. The connection destination attribution/connection table 33 contains connection destination attribution and connection setting. The connection destination attribution and the connection setting are associated with each other. The connection destination attribution indicates the attribution of the connection destination, and corresponds to the connection destination attribution in the connection destination attribution table 13. The connection setting indicates the setting of the connection for the connection destination having the attribution. For example, the connection setting indicates the setting of the connection when the connection destination having the attribution performs communication by using the network interface 60. In this example, as the connection destination attribution, the public server, the commercial server, and the R&D server are shown. A connection setting for the public server is SSID_1. A connection setting for the commercial server is SSID_2. A connection setting for the R&D server is SSID_3. Each of the SSID_1, the SSID_2, and the SSID_3 indicates the SSID or the ESSID.

It should be noted that the connection destination having no connection destination attribution may be excluded from the targets of the connection setting. In this case, the connection destination having no connection destination attribution is not allocated with any SSID. Thus, only those connection destinations permitted in advance can make communication. Also, the connection destination having no connection destination attribution may be allocated with a default connection setting. For example, the connection destination having no connection destination attribution may be unconditionally allocated with the SSID_1 as the connection setting.

The remaining aspects are the same as those of the first exemplary embodiment. It should be noted that actually the network connecting apparatus according to the present invention may be configured to perform the connection setting in consideration of the application attribution described in the first exemplary embodiment, the user attribution described in the second exemplary embodiment, and the connection destination attribution described in the present exemplary embodiment as a whole. In other words, the network connecting apparatus according to the present invention accepts both of a connection source and the connection destination as the predetermined target.

Hereinafter, the network connecting apparatus according to a fourth exemplary embodiment of the present invention will be described. In the present exemplary embodiment, a case where the network connecting apparatus according to the present invention is relay equipment will be described. For example, a case where the network connecting apparatus according to the present invention is provided between a wireless LAN spot and a terminal could be considered. As examples of the relay apparatus, a media converter such as a wireless LAN converter, a router, a switch, a gateway, a firewall, a proxy, an access point, and a computer that can serve as a router could be considered. Such a relay apparatus is supposed to be configured for wireless communication. However, the present invention is not limited to these examples.

Preferably, the network connecting apparatus according to the present exemplary embodiment is configured to make wired communication with the terminal and wireless communication with the wireless LAN access point, when provided between the terminal and the wireless LAN access point. However, the network connecting apparatus according to the present exemplary embodiment may be configured to make wireless communication with each of the wireless LAN spot and the terminal. In this case, the network connecting apparatus according to the present exemplary embodiment can serve as a mobile router that utilizes a wireless line as a WAN line.

The network connecting apparatus according to the present exemplary embodiment acquires an identification data of a predetermined target from the terminal, to perform the connection setting according to the attribution of the target, when relaying the communication between the terminal and the wireless LAN access point. For example, the network connecting apparatus according to the present exemplary embodiment acquires a data on a type of application and a connection destination based on a packet received from the terminal, and executes the connection setting according to the corresponding application attribution and the connection destination attribution.

Hereinafter, the network connecting apparatus according to a fifth exemplary embodiment the present invention will be described. In the present exemplary embodiment, a case where a terminal attribution is used in place of the application attribution in case of the network connecting apparatus as a relay apparatus. Different SSIDs are allocated to wireless LAN communication performed by a PC and wireless LAN communication performed by a game console.

Figure 10:
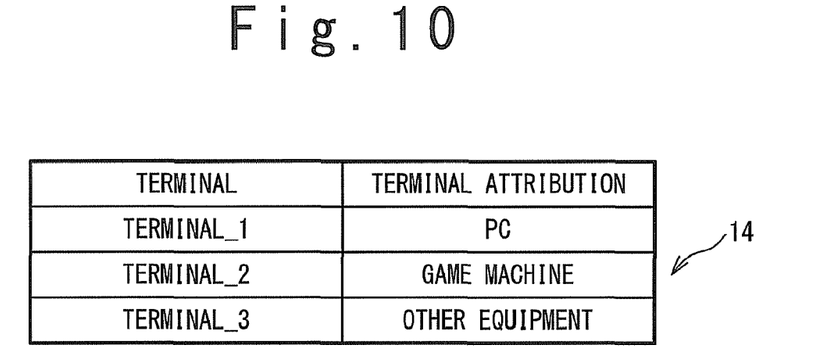
FIG. 10 is an example of a terminal attribution table.

It will be assumed that the network connecting apparatus according to the present exemplary embodiment is provided between the wireless LAN access point and the terminal. The network connecting apparatus according to the present exemplary embodiment is basically the same as that of the fourth exemplary embodiment. In the present exemplary embodiment, the attribution table 10 is exemplified by a terminal attribution table 14. Referring to FIG. 10, a format example of the terminal attribution table 14 will be described.

The terminal attribution table 14 contains "terminal" and "terminal attribution". The terminal and the terminal attribution are associated with each other. The terminal indicates an identification data of the terminal that performs communication through the wireless LAN. As examples of the identification data of the terminal, a serial number and a manufacturer data are considered. The terminal attribution indicates an attribution accompanying the terminal. In this example, the terminal indicates a terminal_1, a terminal_2, or a terminal_3. A terminal attribution of the terminal_1 is the PC. A terminal attribution of the terminal_2 is the game console. A terminal attribution of the terminal_3 is another apparatus. A terminal having no the terminal attribution may be allocated with a default terminal attribution. For example, the terminal having no terminal attribution may be unconditionally regarded as a terminal having the terminal attribution as another apparatus.

Figure 11:
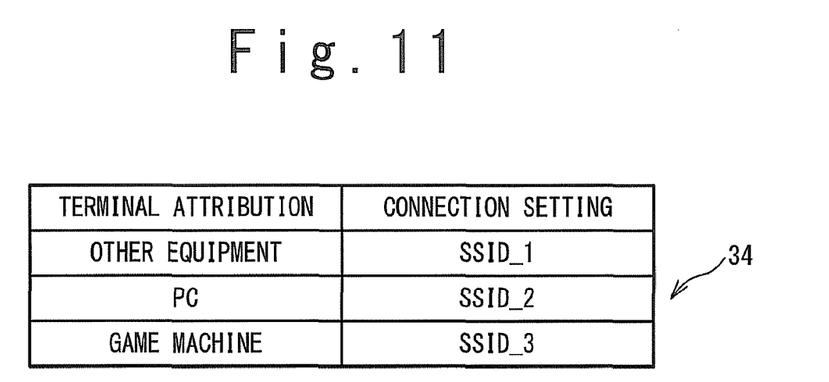
FIG. 11 is an example of a terminal attribution/connection setting table.

In the present exemplary embodiment, the connection table 30 is exemplified by a terminal attribution/connection table 34. Referring to FIG. 11, a format example of the terminal attribution/connection table 34 will be described. The terminal attribution/connection table 34 contains "terminal attribution" and "connection setting". The terminal attribution and the connection setting are associated with each other. The terminal attribution indicates the attribution of a predetermined terminal, and corresponds to the terminal attribution in the terminal attribution table 14. The connection setting indicates the setting of the connection for a terminal having the attribution. For example, the connection setting indicates the setting of the connection when the terminal having the attribution performs communication through the network interface 60. In this example, the terminal attribution indicates another apparatus, the PC, or the game console. A connection setting for the other apparatus is SSID_1. A connection setting for the PC is SSID_2. A connection setting for the game console is SSID_3. Each of the SSID_1, the SSID-2, and the SSID_3 is SSID or ESSID.

It should be noted that the connection setting may not be performed to a terminal having no terminal attribution. In this case, the terminal having no terminal attribution is not allocated with any SSID. Thus, only the terminal permitted in advance may be set to be possible to make communication. Also, the terminal having no terminal attribution may be allocated with a default connection setting. For example, the terminal having no terminal attribution may be unconditionally allocated with the SSID_1 as the connection setting.

The network connecting apparatus according to the present exemplary embodiment acquires an identification data on a type of the terminal from the terminal, to perform the connection setting according to the attribution of the terminal, when relaying the communication between the terminal and the wireless LAN access point. For example, the network connecting apparatus according to the present exemplary embodiment acquires the data on the type of the terminal based on a packet received from the terminal, and performs a connection setting according to the corresponding terminal attribution.

Hereinafter, the network connecting apparatus according to a sixth exemplary embodiment of the present invention will be described. In the present exemplary embodiment, a case where a plurality of network interfaces are provided will be described. For example, a case where the network connecting apparatus includes a plurality of NICs for the wireless LAN is considered. In the present exemplary embodiment, it is assumed that a plurality of network interfaces 60 are provided.

In the present exemplary embodiment, the attribution table 10 is exemplified by the application attribution table 11, as in the first exemplary embodiment. The content of the application attribution table 11 is as shown in FIG. 2. Also, in the present exemplary embodiment, the connection table 30 is exemplified by an application attribution/connection setting/interface (I/F) table 35.

Figure 12:
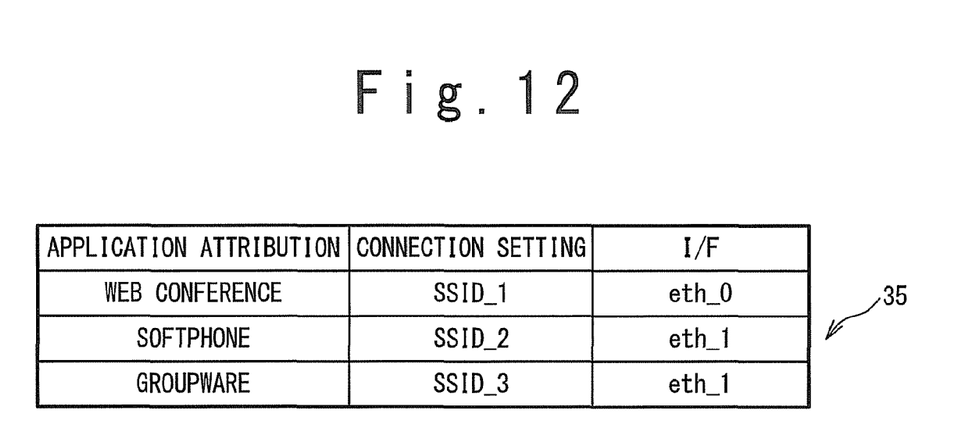
FIG. 12 is an example of an application attribution/connection setting/interface (I/F) table.

Referring to FIG. 12, a format example of the application attribution/connection setting/interface table 35 will be described. The application attribution/connection setting/interface table 35 contains "application attribution", "connection setting", and "interface". The application attribution and the connection setting are associated with each other. The application attribution indicates an attribution of a predetermined application, and corresponds to the application attribution in the application attribution table 11. The connection setting indicates the setting of the connection for the application having the attribution. For example, the connection setting indicates the setting of the connection when the application having the attribution is executed through the network interface 60. The interface indicates a network interface available to the application having the attribution. In this example, the application attribution indicates a WEB conference, softphone, or groupware. A connection setting for the WEB conference is SSID_1, and the interface therefor is eth_0. A connection setting for the softphone is SSID_2, and the interface therefor is eth_1. A connection setting for the groupware is SSID_3, and the interface therefor is eth_1. Each of the SSID_1, the SSID_2, and the SSID_3 is the SSID or the ESSID. The eth_0 and the eth_1 indicate identification data of the network interface.

In this case, a plurality of network interfaces may be registered in the interface in a descending order with respect to each application attribution. The connection setting section 40 may be set to select a network interface having a second highest priority, in the case where the network interface of a highest priority is unavailable. The connecting section 50 performs connection by using the network interface 60 according to a connection setting by the connection setting section 40.

Although the application attribution is taken up as the example in the foregoing description, other properties such as the user attribution may be used.

It should be noted that in the present exemplary embodiment, it is also possible to select a desired one of a plurality of network interfaces of different standards, and to perform the connection by using the selected network interface. For example, the network interface that utilizes the wireless LAN and the network interface that utilizes a mobile phone network may be selectively used. In this case, the SSID is registered as the connection setting in the application attribution/connection setting/interface table 35, only when the network interface that utilizes the wireless LAN is employed. In other words, it is not necessary to register the SSID as the connection setting in the application attribution connection setting interface table 35, when the interface is not the network interface that utilizes the wireless LAN. The connection setting section 40 selects the SSID only when the interface is the network interface that utilizes the wireless LAN. Regarding the network interfaces that do not utilize the wireless LAN, the connection setting in the communication system utilized by the network interface may be registered instead of the SSID, in the application attribution connection setting interface table 35. In this case, the plurality of network interfaces 60 may include a communication interface compatible with wired communication.

Examples of the communication system available to the plurality of network interfaces 60 other than the wireless LAN include a mobile phone network, WiMAX, a 3G (third generation) mobile phone, an exclusive line, IrDA (Infrared Data Association), and Bluetooth (registered trademark). However, the present invention is not limited to them. Examples of the network interface 60 that employs the communication system other than the wireless LAN include a network adapter such as a NIC, a communication apparatus such as an antenna, and a communication port such as a connector. However, the present invention is not limited to them.

The foregoing exemplary embodiments of the present invention may be realized in a combination. For example, the SSIDs finely classified according to a plurality of properties such as the application attribution and the user attribution may be allocated.

It should be noted that the network connecting apparatus according to the present invention not only includes a terminal or a relay apparatus, but also an apparatus incorporated in the terminal and the relay apparatus, as well as a peripheral device to be connected thereto. For example, the network connecting apparatus according to the present invention may be a NIC for the wireless LAN, other expansion boards, or a semiconductor IC for communication control.

In this way, in the present invention, apparatus that utilizes the wireless network is used in different connection settings (SSID) for every target, thereby facilitating the utilization in compliance with a network design policy. When a same network resource is distinctly used according to the design policy, it is necessary to provide a mechanism that reflects a policy on the terminal side from the wireless network. In the present invention, the operation of the terminal in compliance with the network design policy, as well as securing the communication quality according to the attribution of the target.

The present invention can be applied to implementation of a wireless LAN connection utility software.

Although the foregoing description refers to the wireless LAN as the example, the applicability of the present invention is not limited to the wireless LAN. For example, when the wireless resources such as the channels are freely available to construct the wireless communication network, a connection setting that utilizes a desired wireless resource may be provided, to carry out the present invention. In this case, a wireless identifier corresponding to the SSID may be prepared in the wireless communication network, so that the desired wireless resource may be allocated to the wireless identifier.

One feature of the present invention is in that the connection setting can be changed according to the attribution accompanying the target, and in addition, another feature of the present invention is in that the correlation among the target, the attribution, and the connection setting can be changed as desired. In other words, the present invention has a feature that the correlation among the target, the attribution, and the connection setting is not fixed. In the present invention, the correlation is simply changed by changing the data stored in any of the tables such as the attribution table and the connection table, when the need to change the attribution or the connection setting arises afterwards, thereby providing greater flexibility.

While the present invention has been particularly shown and described with reference to the exemplary embodiments thereof, the present invention is not limited to these exemplary embodiments. It will be understood by those of ordinary skill in the art that various changes in form and details may be made therein without departing from the spirit and scope of the present invention as defined by the claims.

What is claimed is:

1. A network connecting apparatus to wirelessly communicate with a base station, comprising:

an attribution table in which relations of targets and attributions of the targets are registered;

an attribution determining section configured to specify a target when detecting a request of a wireless communication associated with the target, and refer to said attribution table to determine the attribution of the target;

a connection setting table in which relations of the attributions and available connection settings are registered;

a connection setting section configured to change a connection setting based on the target attribution by referring to said connection setting table; and a connecting section configured to execute a connecting process for the wireless communication based on the connection setting, such that responsive to the connecting process performed by the network connecting apparatus, the base station is to determine whether a connection from the network connecting apparatus to the base station is permissible, and such that the network connecting apparatus itself does not make this determination, the network connecting apparatus being a terminal, wherein at least one of said attribution table and said connection setting table exists in an external storage unit, and wherein said connecting section performs the connecting process for the radio communication based on an initial connection setting which does not depend on the target attribution, when said external storage unit must be accessed due to the wireless communication, and accesses said external storage unit.

2. The network connecting apparatus according to claim 1, wherein said connecting section limits the connecting process for the radio communication, when said attribution determining section cannot refer to said attribution table, or when said connection setting section cannot refer to said connection setting table.

3. The network connecting apparatus according to claim 1, wherein said connection setting table registers relations of one target attribution and connection settings, wherein said connection settings are allocated with priorities, said connection setting section selects the connection setting having one priority from said connection settings, and selects the connection setting having a next higher priority to a selected connection setting, from said connection settings, when said connecting section cannot execute the connecting process based on the selected connection setting.

4. The network connecting apparatus according to claim 1, wherein priorities are allocated to target attributions in order in said connection setting table, and when there are targets, and the wireless communication associated with each of the targets is requested, said connection setting section performs the connection setting based on the target attribution with the highest of the priorities of the targets.

5. The network connecting apparatus according to claim 1, wherein said connection setting section continues to use a previous connection setting, when the wireless communication associated with each of the targets is requested.

6. The network connecting apparatus according to claim 1, wherein said connection setting table registers relations of the target attribution, available connection settings and network interfaces, and said connection setting section performs the connection setting to said network interface based on the target attribution, when the network interface corresponding to the target attribution is compatible with the wireless communication.

7. A connection setting method comprising:

specifying, by a network connecting apparatus that is a terminal, a target when detecting a request of a wireless communication associated with the target, the network connecting apparatus to wirelessly communicate with a base station;

determining, by the network connecting apparatus, the attribution of the target by referring to an attribution table in which relations of targets and attributions of the targets are registered;

changing, by the network connecting apparatus, a connection setting based on the target attribution by referring to a connection setting table in which relations of the attributions and available connection settings are registered; and executing, by the network connecting apparatus, a connecting process for the wireless communication based on the connection setting, such that responsive to the connecting process performed by the network connecting apparatus, the base station is to determine whether a connection from the network connecting apparatus to the base station is permissible, and such that the network connecting apparatus itself does not make this determination, wherein at least one of said attribution table and said connection setting table exists in an external storage unit, and wherein said connecting section method further comprises:

performing the connecting process for the radio communication based on an initial connection setting which does not depend on the target attribution, when said external storage unit must be accessed due to the wireless communication; and accessing said external storage unit.

8. The connection setting method according to claim 7, further comprising:

limiting the connecting process for the radio communication, when said attribution table cannot be referred to or when said connection setting table cannot be referred to.

9. The connection setting method according to claim 7, wherein said connection setting table registers relations of one target attribution and connection settings, wherein said connection settings are allocated with priorities, said connecting section method further comprises:

selecting the connection setting having one priority from said connection settings; and selecting the connection setting having a next higher priority to a selected connection setting, from said connection settings, when said connecting section cannot execute the connecting process based on the selected connection setting.

10. The connection setting method according to claim 7, wherein priorities are allocated to target attributions in order in said connection setting table, and said connecting section method further comprises:

when the wireless communication associated with each of the targets is requested, performing the connection setting based on the target attribution with the highest of the priorities of the targets.

11. The connection setting method according to claim 7, further comprising:

continuing to use a previous connection setting, when the wireless communication associated with each of the targets is requested.

12. The connection setting method according to claim 7, wherein said connection setting table registers relations of the target attribution, available connection settings and network interfaces, and said connection setting method further comprises:

performing the connection setting to said network interface based on the target attribution, when the network interface corresponding to the target attribution is compatible with the wireless communication.

13. A non-transitory computer-readable storage medium in which a computer-readable program code is stored to realize a connection setting method which comprises:

specifying, by a network connecting apparatus that is a terminal, a target when detecting a request of a wireless communication associated with the target, the network connecting apparatus to wirelessly communicate with a base station;

determining, by the network connecting apparatus, the attribution of the target by referring to an attribution table in which relations of targets and attributions of the targets are registered;

changing, by the network connecting apparatus, a connection setting based on the target attribution by referring to a connection setting table in which relations of the attributions and available connection settings are registered; and executing, by the network connecting apparatus, a connecting process for the wireless communication based on the connection setting, such that responsive to the connecting process performed by the network connecting apparatus, the base station is to determine whether a connection from the network connecting apparatus to the base station is permissible, and such that the network connecting apparatus itself does not make this determination, wherein at least one of said attribution table and said connection setting table exists in an external storage unit, and wherein said connecting section method further comprises:
performing the connecting process for the radio communication based on an initial connection setting which does not depend on the target attribution, when said external storage unit must be accessed due to the wireless communication; and accessing said external storage unit.

14. The non-transitory computer-readable storage medium according to claim 13, wherein said connection setting method further comprises:
limiting the connecting process for the radio communication, when said attribution table cannot be referred to or when said connection setting table cannot be referred to.

15. The non-transitory computer-readable storage medium according to claim 13, wherein said connection setting table registers relations of one target attribution and connection settings, wherein said connection settings are allocated with priorities,
said connecting section method further comprises:
selecting the connection setting having one priority from said connection settings; and
selecting the connection setting having a next higher priority to a selected connection setting, from said connection settings, when said connecting section cannot execute the connecting process based on the selected connection setting.

16. The non-transitory computer-readable storage medium according to claim 13, wherein priorities are allocated to target attributions in order in said connection setting table, and
said connecting section method further comprises:
when the wireless communication associated with each of the targets is requested, performing the connection setting based on the target attribution with the highest of the priorities of the targets.

17. The non-transitory computer-readable storage medium according to claim 13, wherein said connection setting method further comprises:
continuing to use a previous connection setting, when the wireless communication associated with each of the targets is requested.

18. The non-transitory computer-readable storage medium according to claim 13, wherein said connection setting table registers relations of the target attribution, available connection settings and network interfaces, and
said connection setting method further comprises:
performing the connection setting to said network interface based on the target attribution, when the network interface corresponding to the target attribution is compatible with the wireless communication.

* * * * *